Nov. 3, 1925.　　　　　　　　　　　　　　　　　　1,560,077
F. GELSTHARP
APPARATUS FOR MAKING GLASS SHEETS
Filed Jan. 23, 1922　　　2 Sheets-Sheet 1

INVENTOR
Frederick Gelstharp
by
James C. Bradley
Atty

Nov. 3, 1925.

F. GELSTHARP 1,560,077

APPARATUS FOR MAKING GLASS SHEETS

Filed Jan. 23, 1922  2 Sheets-Sheet 2

INVENTOR
Frederick Gelstharp
by
James C. Bradley
Atty

Patented Nov. 3, 1925.

1,560,077

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

APPARATUS FOR MAKING GLASS SHEETS.

Application filed January 23, 1922. Serial No. 531,054.

*To all whom it may concern:*

Be it known that I, FREDERICK GELSTHARP, a citizen of Great Britain, and a resident of Tarentum, in the county of Allegheny and State of Pennsylvania, have made a new and useful invention in Improvements in Apparatus for Making Glass Sheets, of which the following is a specification.

Figure 1:
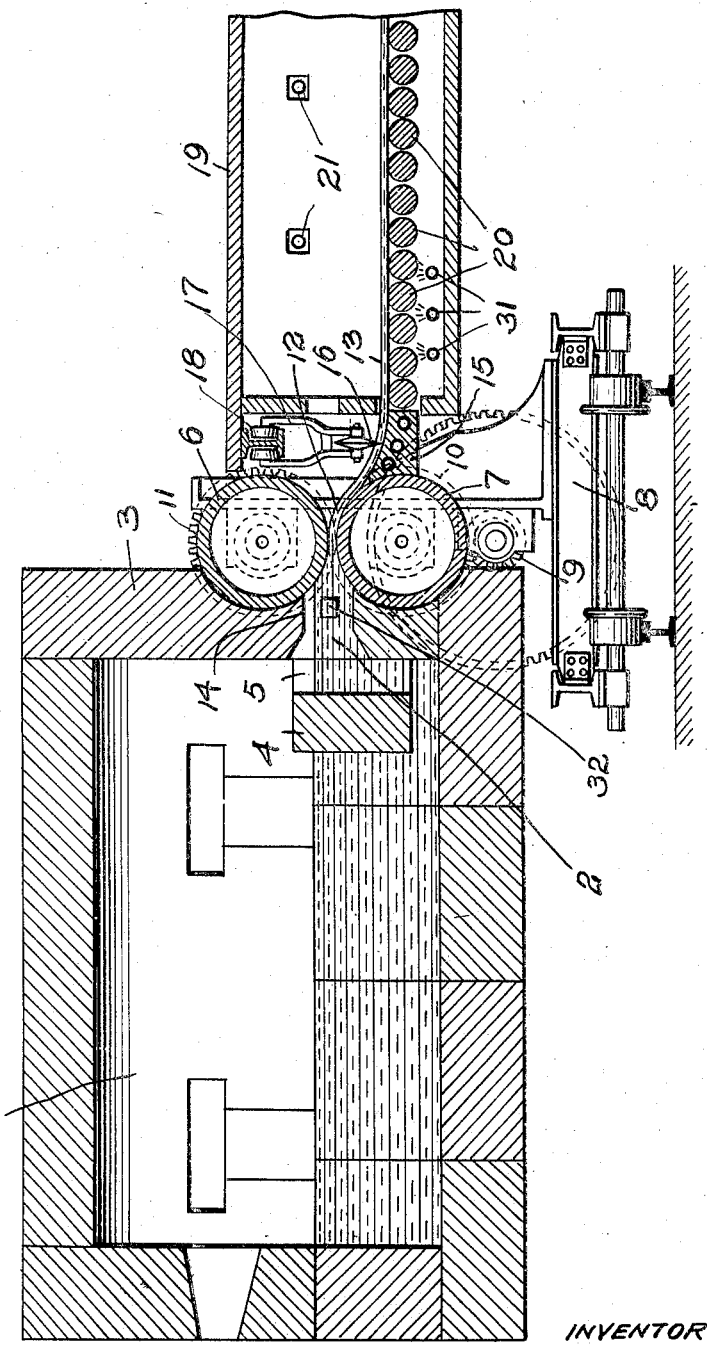
Figure 2:
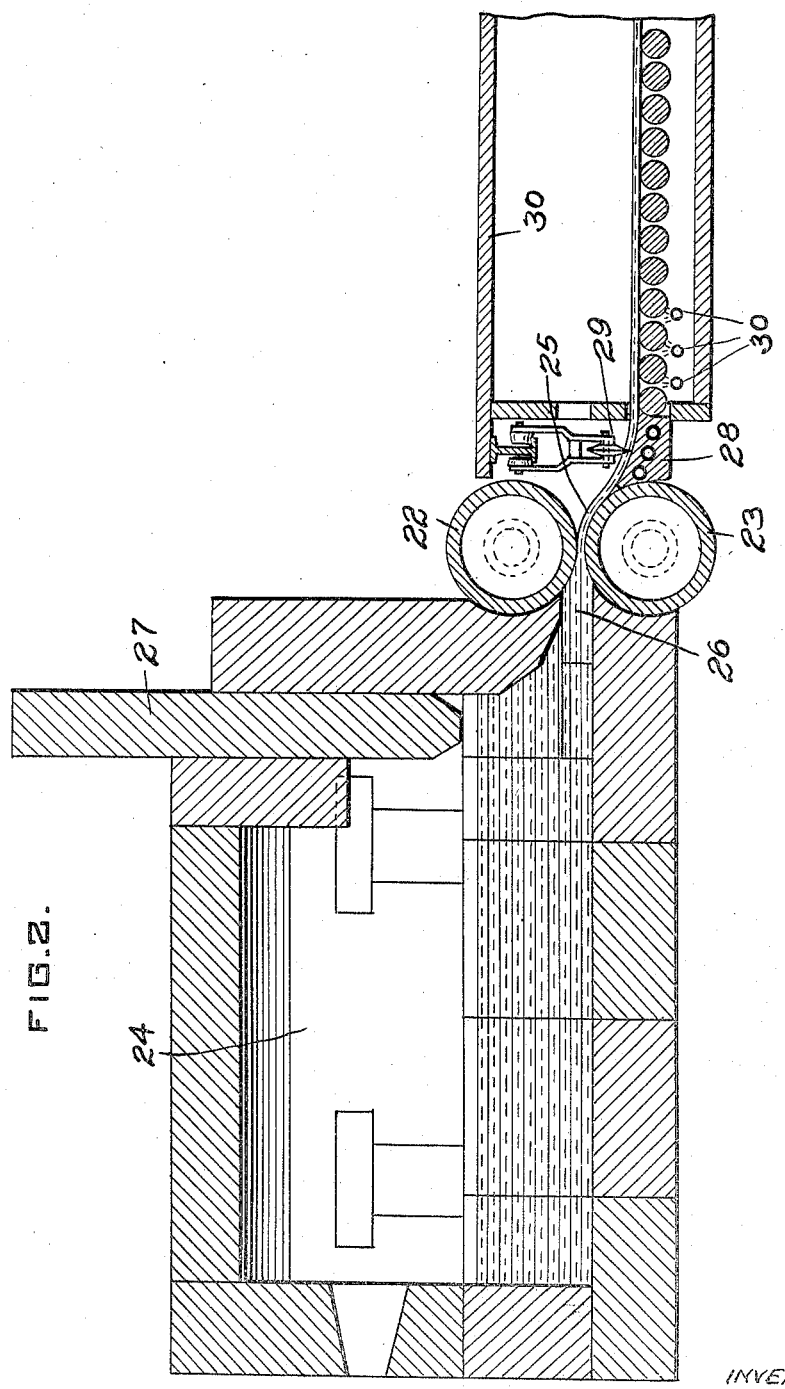

The invention relates to the making of sheet glass and involves one of the modifications of the apparatus shown in my application, Serial No. 656,441, filed August 8, 1923. It has for its principal objects, the provision of an improved arrangement for continuously forming the ribbon of glass directly from the melting tank; the provision of a construction in which the tendency to elongate any bubbles in the glass is reduced; and the provision of an improved means and method of procedure for continuously producing a ribbon of glass and dividing it into sections. Certain embodiments of the invention are illustrated in the accompanying drawings, wherein:

Figure 1 is a vertical section through one form of the apparatus, and Fig. 2 is a vertical section through a modified construction.

The tank 1 of the present application differs from those of my prior applications heretofore referred to in that it has no forehearth, the glass being withdrawn directly from the tank in which it is melted through the passage or opening 2 in the side wall 3 of the tank. As in my copending application, the tank illustrated is of relatively small size, but it will be understood that the invention is applicable either to a day tank of small capacity or to a large melting tank of such capacity that the formation of the sheet may be made continuous day and night. The flow of glass through the passage 2 may be cut off any time by means of the float 4 corresponding to the float 48 shown in Fig. 3 of my copending application. This float acts as a skimmer and is normally held away from the rear face of the wall 3 by means of a pair of blocks 5 at the ends of the float, which blocks may be removed when it is desired to bring the float over the end of the opening 2 and thus cut off the flow of glass.

The rolls 6 and 7 are hollow and water cooled as fully set forth in my copending application and are preferably mounted upon a truck 8 so that they may be moved laterally from in front of the furnace just as shown and described in my copending application. The driving means for the rolls is also preferably of the character shown in the said application, the motor being mounted upon the truck, and, after suitable speed reduction, driving the pinion 9, which in turn drives the spur gear 10 secured to the roll 7 and meshing with a similar spur gear 11 secured to the roll 6. The space 12, through which the ribbon 13 is fed, is located slightly below the glass level in the tank and such glass level lies below the upper lip 14 of the slot or passageway instead of contacting with this upper lip, as is the case in my other applications heretofore referred to. This latter feature has the advantage that the retarding action of the upper lip upon the glass flowing through the slot is eliminated so that any elongation or bubbles or similar defects due to this cause is avoided. The contamination of the glass incident to the washing away of the clay is also less when only one lip of the outlet passage contacts with the glass and it is possible by lowering the level of the glass to substantially reduce the area of contact of the upper roll 6 with the glass, thus reducing the tendency to mechanical ream incident to severe chilling of the glass by the roll. Further, the flattening or elongating of any bubbles in the sheet is lessened, as the upper portion of the sheet, due to the reduced chilling effect of the upper roll, remains softer and more plastic than would otherwise be the case, so that the bubbles, even if flattened or elongated, have a better chance to resume their spherical shape than would be the case if the glass were less plastic. I have found that the glass will be withdrawn through the rolls even when the glass level drops to a point in line with the space 12 or even below it, so that it is not necessary to maintain the level of the glass with any great degree of exactness. Preferably this level is kept slightly above the level of the space 12 between the rolls just as illustrated.

The glass ribbon, after passing the rolls, moves over the upper surface of a metal platen 15, which is preferably perforated and water cooled to avoid any danger of the glass sticking thereto after the device has been in operation a considerable time and the platen heated up to a high degree by contact with the ribbon. The cooling of the platen should only be sufficient to prevent the sticking of the glass as it is desirable that the glass should be plastic as it passes over the platen and through the leer.

In order to avoid the requirement of severing the glass sheet after it has cooled and hardened, it may be severed while still plastic and before it enters the leer by means of a cutting wheel 16, or series of cutting wheels mounted upon the carriage 17 and movable along the transversely extending I-beam 18. The cutter is preferably supported from the beam 18 in such a way that its pressure is sufficient to cut entirely through the plastic or semi-plastic glass, so that as the glass emerges from the leer, no further cutting or breaking is necessary, such as would be required if the glass were merely scored.

The leer 19 is preferably of the roll type employing a series of driven rolls 20 placed relatively close together at the entrance end of the leer as indicated, in order that the glass as it enters the leer and at a time when it has a slight degree of plasticity, may be supported so that it will not become deformed. The leer may be heated in any desired way, burners 21 for accomplishing this purpose being spaced along its length as required.

In order to assist in remelting any old glass remaining in the passageway 2 after the operation has been discontinued and preliminary to another one or to prevent the glass from freezing at this point, any suitable heating means may be employed, such as a resistance element embedded in the wall surrounding the passageway, as illustrated in my copending application of even date, or such as a current of electricity sent through the glass itself lying in the passageway. The flow of electric current may also be employed in order to regulate the temperature of the glass passing through the slot. To accomplish this latter result, suitable terminals 32 may be placed at the opposite ends of the passageway and sufficient current supplied to raise the temperature of the glass by its passage therethrough.

Fig. 2 illustrates a modification of the construction of Fig. 1, in which the rolls 22 and 23 are located at a lower level than in the Fig. 1 construction, the head of glass in the tank 24 serving to assist in feeding the glass ribbon 25 through the space between the rolls. The means for cutting off the flow of glass to the passage 26 in this construction comprises a vertical movable gate 27, preferably counterweighted and moved by suitable means, not shown. The platen 28, cutter 29, and leer 30 are the same throughout as in the other type of construction, as are also the means for supporting, cooling and driving the feed rolls, a showing of such details of construction not being made in this figure.

To supplement the heat of the sheet as it enters the leer and bring the temperature of the skin of the sheet reduced below that of the center by contact with the rolls 22 and 23 and platen 28, up to that of the center of the sheet, the burners 31 may be employed. This eliminates any strain or warpage to the uneven temperature of the sheet, so that it will be prefectly flat as its temperature gradually drops during the setting and annealing stages.

It will be understood that the invention is not limited to the details of construction illustrated. Various other types of devices for regulating the flow of glass or interrupting it may be employed, and the type of leer and severing devices employed widely modified. For example, any of the other forms of cutter, such as heretofore employed in severing plastic glass, may be employed such as shears, knives or other similar devices.

What I claim is:

1. In combination in apparatus for forming sheet glass, a tank having in its vertical side wall a feed slot having its lower edge below the surface of the glass and its upper edge above such surface, a pair of cooled rolls arranged one above the other spaced apart in opposition to the slot and under the head pressure of the tank so that the space between the rolls constitutes the outlet of the slot, and means for rotating the rolls, the said space between the rolls being of uniform width throughout its length.

2. In combination in apparatus for forming sheet glass, a tank having in its vertical side wall a feed slot having its lower edge below the surface of the glass and its upper edge above such surface, a pair of cooled rolls arranged one above the other spaced apart in opposition to the slot so that the space between the rolls constitutes the outlet of the slot, and means for rotating the rolls, the said space between the rolls being of uniform width throughout its length lying below the surface of the glass in the tank but adjacent thereto and under the head pressure of the tank.

3. In combination in apparatus for forming sheet glass, a tank having an opening in its wall, a pair of cooled feed rolls spaced apart in opposition to the passage so that the space between the rolls constitutes the outlet for the feed passage, means for rotating the rolls, a leer adjacent the rolls and in alignment therewith, a supporting device for the sheet intermediate the rolls and leer, and a severing device between the rolls and leer adapted to pass across the sheet in opposition to said support and sever it while still plastic.

4. In combination in apparatus for forming sheet glass, a tank having an opening in its wall, a pair of cooled feed rolls spaced apart in opposition to the passage so that the space between the rolls constitutes the outlet for the feed passage, means for rotating the rolls, a leer adjacent the rolls, a platen between the rolls and leer, and a cutting device above the platen, adapted to move transversely of the glass sheet on the roll and sever it.

5. In combination in apparatus for forming sheet glass, a tank having an opening in its wall, a pair of cooled feed rolls spaced apart in opposition to the passage so that the space between the rolls constitutes the outlet for the feed passage, means for rotating the rolls, a leer adjacent the rolls, a platen between the rolls and leer, means for cooling the platen, and a cutting device above the platen, adapted to move transversely of the glass sheet and sever it.

In testimony whereof, I have hereunto subscribed my name this 16th day of January, 1922.

FREDERICK GELSTHARP.